UNITED STATES PATENT OFFICE.

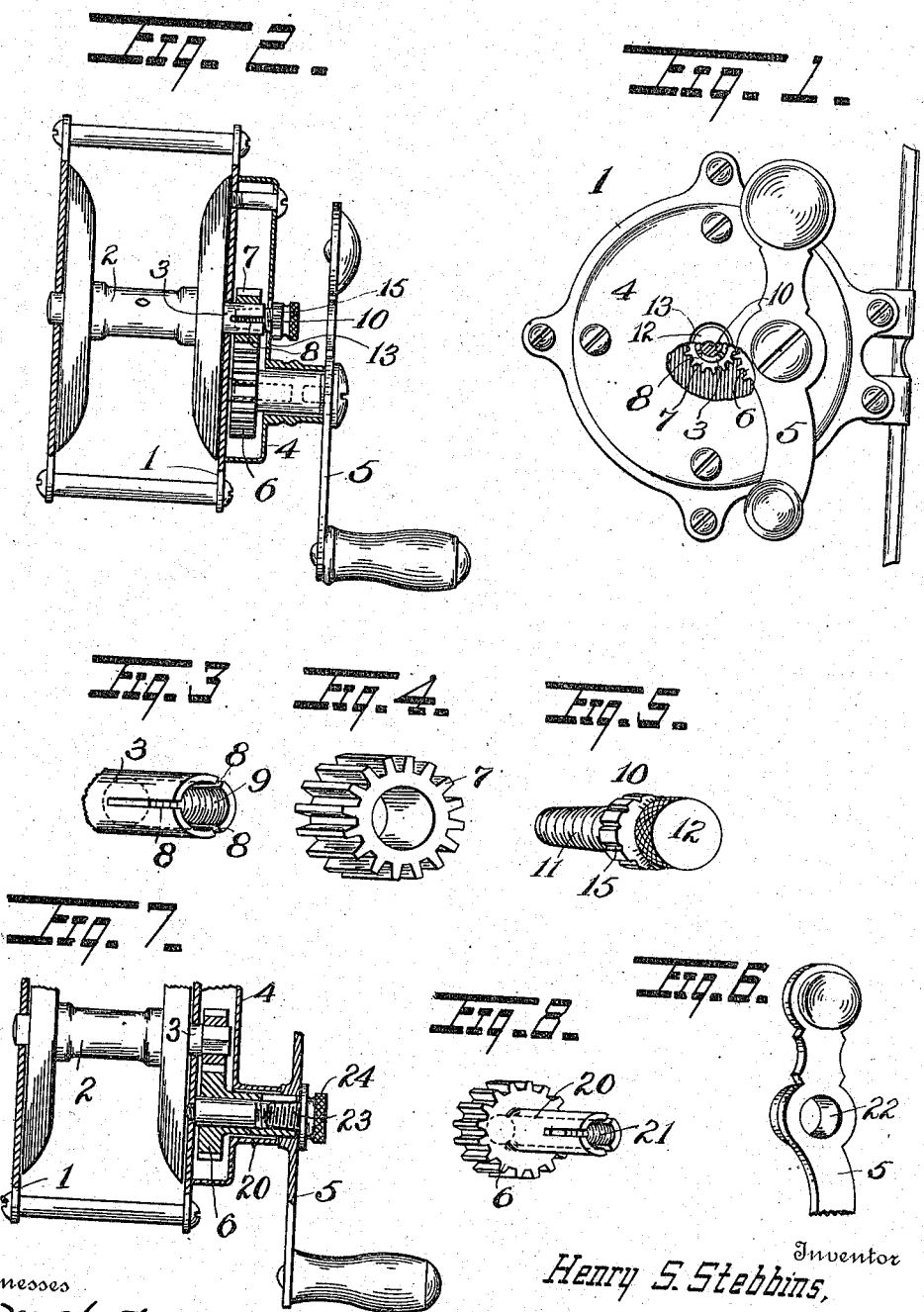

HENRY S. STEBBINS, OF READING, PENNSYLVANIA.

FISHING-REEL.

1,122,042.  Specification of Letters Patent.  Patented Dec. 22, 1914.

Application filed June 13, 1914. Serial No. 844,842.

*To all whom it may concern:*

Be it known that I, HENRY S. STEBBINS, a citizen of the United States, residing at Reading, in the county of Berks and State of Pennsylvania, have invented certain new and useful Improvements in Fishing-Reels, of which the following is a specification.

My invention relates to fishing reels, and particularly to the class in which the winding spool is capable of rotary movement independently of the rotating mechanism therefor. And my object is to provide, in a simple and cheap manner easily applicable to reels of ordinary construction, means for playing the fish and preventing it from getting slack line, to avoid danger of injury to the hand of the fisherman when the fish makes its rushes, and to make provision for paying out the line in such a way as to absolutely prevent the breakage of the tackle.

My invention consists in providing an improved frictional connection between the crank handle and winding spool of the reel, which may be readily and nicely adjusted to the strength of the tackle, locked in such adjustment, as more fully described in connection with the accompanying drawings, and the novel features of which are pointed out in the subjoined claims.

Figure 1 is a side elevation of a reel embodying my invention, part of the gear casing being broken away to more clearly show the construction. Fig. 2 is mainly a sectional elevation of the same. Figs. 3, 4, and 5 are detail views of the separate parts, shown in perspective. Figs. 6, 7 and 8 show a modified embodiment of my invention.

My invention is applicable to either a single-acting or double-acting reel, but in the drawings I have indicated only the latter. This reel, which is of ordinary construction, consists of a frame 1, attachable to a rod, and a winding spool 2 rotatably mounted therein and having its shaft 3 extending into a gear casing 4 fixed to the frame. An operating crank 5 rotates said spool through multiplying gears 6 and 7 as usual.

My invention consists in frictionally driving this spool 2, so that when the strain thereon exceeds a predetermined amount it may remain stationary or turn independently of the rotating action of the crank. In Figs. 1 to 6 I accomplish this by providing the shaft 3, within the casing 4, with longitudinal slots 8, and a recess 9, internally screw-threaded as shown, so that said shaft may be expanded to more or less frictionally grip the gear 7 strung thereon. The shaft is expanded by an adjusting screw 10, preferably formed as shown with a tapered screw-threaded portion 11 adapted to engage the recess 9, and a knurled head 12 extending through an opening 13 in the casing 4, so that adjustment of the friction may be conveniently made.

The screw 10 is manipulated to exert a frictional grip on the gear 7 so that it may rotate the spool 2 up to the maximum capacity of the tackle, but beyond which the gear 7 will slip on the shaft 3. The fisherman may thus freely turn the crank 5 knowing that when the strain upon his tackle becomes excessive the gear 7 will slip and prevent breaking. Also when a hooked fish makes a rush the fisherman may hold his reel, the slippage of the gear 7 permitting the line to unwind from the spool 2 until the strain thereon comes within the safe capacity of the tackle, when the line will again be held. In Figs. 7 to 9 I have indicated this frictional grip applied to the crank 5. This is readily accomplished by slotting the hub 20 of the gear 6 as shown and providing the same with a screw-threaded recess 21. The crank 5 has an aperture 22 frictionally held by the hub 20, and the retaining screw 23 is adapted to engage in the recess 21 and to adjustably expand the same to a determined frictional grip in the crank aperture 22. The knurled head 24 of the screw 23 permits of readily adjusting this friction.

In a single-acting reel where the crank is directly connected to the winding spool shaft, my invention is equally applicable as will be readily understood.

My invention is simple and effective and may be readily and cheaply applied to reels of ordinary construction, and thus provide in a moderate priced reel all the advantages of an expensive automatic reel.

What I claim is:

1. In a fishing reel, a winding mechanism comprising a winding spool, a split winding shaft, a winding member frictionally mounted upon said split shaft, and a shaft-spreading screw adapted to vary the frictional engagement of said winding member and shaft so as to permit of slipping under undue strain.

2. In a fishing reel, a winding spool having a split shaft, a driving gear frictionally mounted thereon, and a shaft-spreading screw in said split shaft adapted to vary the frictional engagement of said shaft and gear, so as to permit of slippage under undue strains.

3. In a fishing reel, a frame and a gear casing fixed thereto, a winding spool rotatably mounted in said frame and having a split shaft extending into said casing, a driving gear frictionally mounted on said shaft within said casing, a shaft spreading screw extending through said casing into said split shaft for varying the frictional engagement with said gear so as to permit of slippage under undue strain, and a crank shaft having a driving pinion meshing with said gear within the casing.

In testimony whereof I affix my signature in presence of two witnesses.

HENRY S. STEBBINS.

Witnesses:
D. M. STEWART,
ADAM L. OTTERBEIN.